(No Model.) 2 Sheets—Sheet 1.
W. C. LEWIS.
CHILD'S CARRIAGE.
No. 262,545. Patented Aug. 8, 1882.
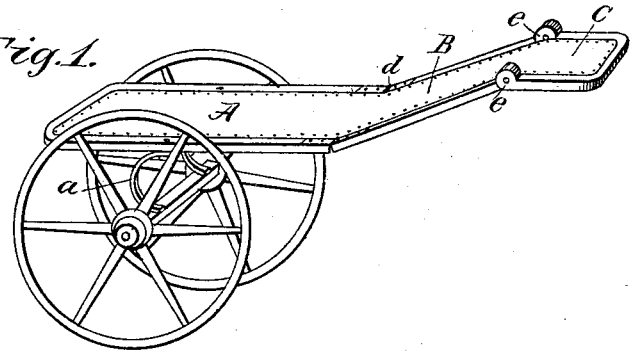
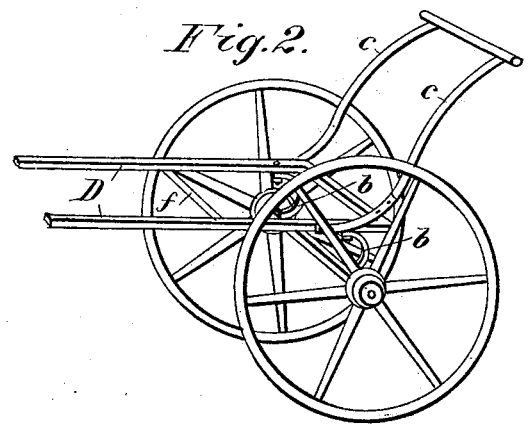
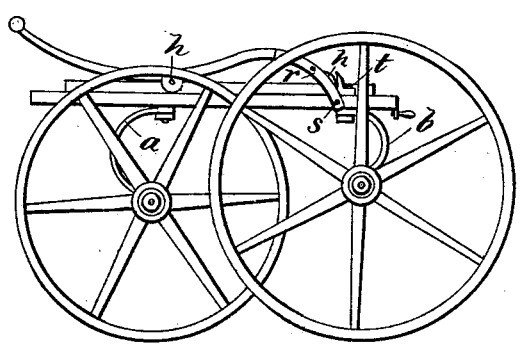
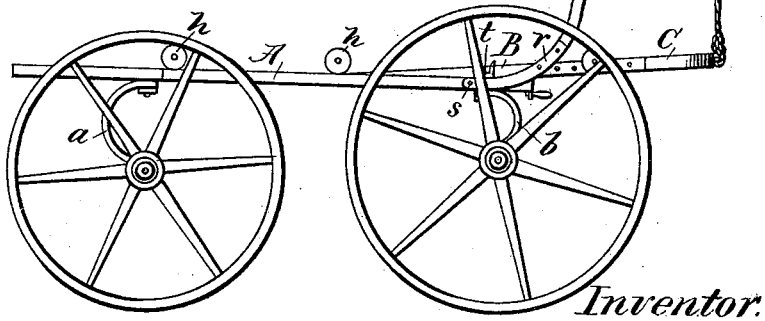
Witnesses.
Wm. G. Bussey
L. Bamberger
Inventor.
Wm. C. Lewis (No Model.) 2 Sheets—Sheet 2.

W. C. LEWIS.
CHILD'S CARRIAGE.

No. 262,545. Patented Aug. 8, 1882.

Witnesses. Inventor

UNITED STATES PATENT OFFICE.

WILLIAM C. LEWIS, OF NEW YORK, N. Y., ASSIGNOR TO LEWIS & MAC-DOUGALL, OF SAME PLACE.

CHILD'S CARRIAGE.

SPECIFICATION forming part of Letters Patent No. 262,545, dated August 8, 1882.

Application filed October 12, 1881. (No model.)

*To all whom it may concern:*

Be it known that I, WILLIAM C. LEWIS, of the city, county, and State of New York, have invented certain new and useful Improvements in Children's Carriages, of which the following is a full, clear, and exact description, reference being had to the accompanying drawings, forming part of this specification.

My invention consists in a child's carriage in which the body or floor is fixed upon the front axle of the running-gear and is arranged to slide horizontally upon a frame fixed upon the rear axle; and also the combination, with said named parts, of the devices hereinafter described, whereby the movement of the front section of the carriage on the rear section thereof may be conveniently caused and controlled; and also the combination, with the said frame fixed on the rear axle, of the body fixed on the front axle and arranged to slide horizontally on said frame, and constructed in sections or parts hinged together, and provided with devices for adjusting said parts in desired positions relatively to each other, as hereinafter set forth, and for the purpose specified.

Figure 5:
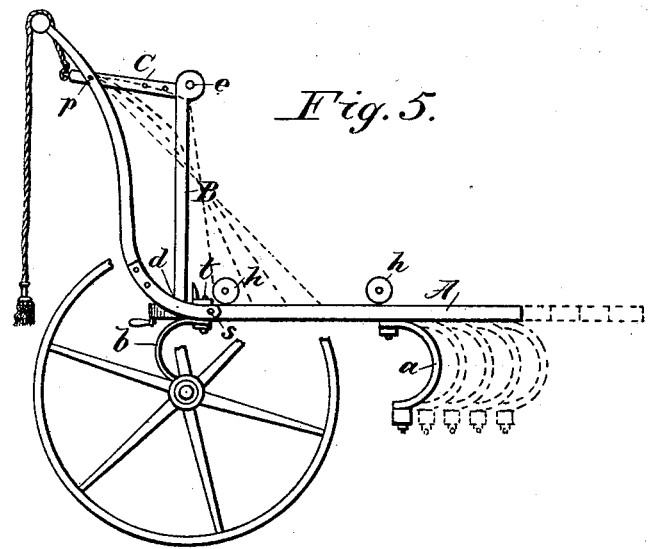
Figure 6:
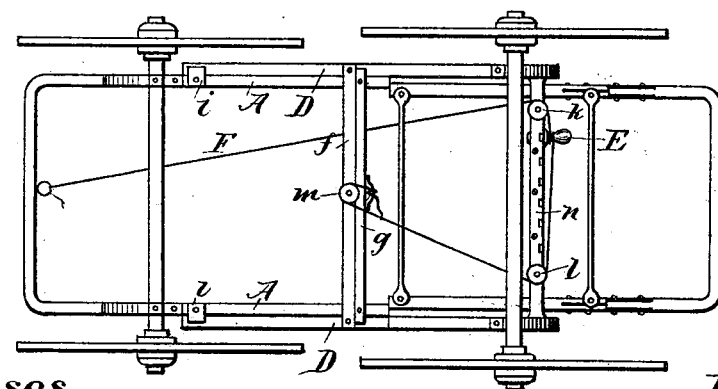

Figure 1 is a view in perspective of the body fixed on the front axle and constituting the front section of the carriage. Fig. 2 is a similar view of the frame fixed in the rear axle and constituting the rear section of the carriage. Fig. 3 is a side elevation of the carriage, showing the body and front axle slid to the rearward limit of the frame on the rear axle, and the body folded upon itself and the handle folded down upon the body, the positions of the parts being such as are intended to be assumed when the vehicle is not in use. Fig. 4 is a similar view of the same, showing the body extended forward upon the frame and its parts arranged in a horizontal line. Fig. 5 is a similar view of the same, the forward wheels being detached, and showing the rearward portion of the body arranged at an angle to the forward part thereof to constitute a back to the carriage; and Fig. 6 is a plan of the under side of the carriage, the sections being shown extended.

A is the body or floor of the carriage, and it is constructed in the three parts or sections A, B, and C, which are hinged together, as shown, the body being divided transversely about midway of its ends and hinged at $d$, so that the two parts thus constituted are capable of being folded down upon each other, as shown, and the rearward portion of the body being again divided transversely and hinged at $e$, as shown. This entire body is then fixedly seated upon or attached to the front axle, $a$, the usual springs shown being employed, the attachment being made to said axle at or near the foward end of the said body.

At D is a frame which is fixed upon the rear axle, $b$, of the carriage, the attachment being made at or near the rearward end of said frame, as shown. This frame is adapted by its form and construction to have the body of the carriage fitted to it, and to enable said body to slide horizontally upon it. This may be accomplished in various ways; but I prefer the manner and devices shown in the drawings—namely, the sides of the frame are arranged to permit the longitudinal edges of the body to pass easily between them, as shown, and cross-brace $f$ extends from the opposite sides of D under the body A, the body resting on it, and a cross-brace, $g$, extends from the opposite sides of the body and its ends project out under the sides of D. The plates or lugs $i$ may be secured to the under side of the edges of the body and project out under the sides of D, as shown. I also find it convenient to employ rollers $h$, which are set on bearings on angle-irons fixed on the upper side of the longitudinal edges of the body, and traverse the upper faces of the sides of D, as shown. The parts being thus constructed and arranged, and the front axle being made somewhat shorter than the rear axle, the body borne by the front axle may be slid rearward on the frame D to the position shown in Fig. 3, or may be slid forward on said frame, as seen in Figs. 4 and 5. It is thus evident that while the body may be slid forward or backward upon the frame D, and the axles be thus brought closer together or moved farther apart, these movements of said parts will not necessarily operate to alter in any way the length, continuity, or attitude of the body itself, while at all times and at whatever position the body is placed on the frame D the center of gravity of the body will be maintained at a point forward of the rear axle, so that the liability of the carriage to tip over rearward is avoided.

To cause the body to move on the frame D and to limit and contract such movement, I find the following devices preferable for simplicity, economy of construction, and effectiveness: A cord, F, is attached at one end to the forward part of the body A, and passes thence to and around the pulleys $k$ and $l$, set on the rear end of the frame D, as seen in Fig. 6, and thence to and around a pulley, $m$, on the brace $f$, thence to the brace $g$, to which its opposite end is secured. It is evident that by pulling upon the cord at the part between the pulleys $k$ and $l$ in one direction or the other the body will be drawn either rearward or forward upon the frame D. I find it convenient to attach a handle or pull, E, to the cord between the pulleys $k$ and $l$, and a stud or arm being arranged to project from said pull on the opposite side of said cord and to fit into a series of notches formed in a bar, $n$, fixed on the frame D, as shown, the movement of said cord may be limited and controlled.

At $c$ is shown the carriage-handle, the lower ends of the arms of which are pivoted at $s$ to the outer sides of the frame D, and provided with buttons $t$ for securing the handle in an upright attitude, as seen in Fig. 4.

A cord, G, is attached to the edge of the rearward portion, C, of the body, and is adapted in length to extend upward and around the cross-bar of the handle, as seen in Figs. 4 and 5, and a catch or sliding pin, $p$, is arranged at the side edges of the section C of the body and adapted to engage a recess in the handle-arms. When the body is placed in the position shown in Fig. 5 the catch supports the sections B C, thus constituting the back at whatever angle they are placed to the part A.

It is evident that the body may be slid forward on the frame D into the position shown in Fig. 4, and that the hinged section of the body may be caused to assume the horizontal attitude seen in Fig. 4, the rearward end, C, of the body being supported partly by the cord G, passing up over and secured to the handle, and the child be thus allowed to recline at full length in the vehicle; or the section B may be drawn upward at any desired angle to the section A of the body, and supported there by the catch $p$, as set forth, and the child be thus placed in more or less of a sitting posture, as indicated in Fig. 5, it being apparent that whatever the position of the body A may be on the frame D, whether slid more or less forward or rearward, the length and continuity of the body or bed will not be changed, and also that whatever be the posture of the child the center of gravity of the bed of the carriage will be always maintained forward of the rear axle.

The body may be provided with sides, which may be hinged to the floor, so as to fold down upon the same.

When the carriage is not in use it may have its parts adjusted in the position shown in Fig. 3, and will then occupy but a limited space.

What I claim as my invention, and desire to secure by Letters Patent, is—

1. In a child's carriage, the combination of the entire body, composed of the sections A and B, hinged at $d$, fixed rigidly at its forward end upon the front axle, with a frame upon which said body is adapted to slide horizontally, fixed at its rearward end on the rear axle, all constructed and arranged to operate as and for the purpose specified.

2. In a child's carriage, the combination of the entire body, formed of the sections A, B, and C, hinged together, as specified, and fixed rigidly at its forward part to the front axle, with the frame D, fixed at its rearward end to the rear axle, and the cross-braces $f$ and $g$, and the rollers $h$, all constructed and arranged to operate as and for the purpose described.

3. In a child's carriage, the combination, with the body A B C, fixed rigidly upon the front axle, and the frame D, upon which said body may slide horizontally, fixed on the rear axle, of the cord F, the pulleys $k$, $l$, and $m$, and the pull E, all constructed and arranged to operate as and for the purpose specified.

4. The combination, in a child's carriage, of the body composed of the sections A, B, and C, hinged together, as described, and rigidly fixed on the front axle, the frame D, on which the said body may slide horizontally, fixed on the rear axle, together with the handle $c$ and the catch $p$ on the side edges of the section C of the body, with the recess in the handle-arms, substantially as and for the purpose specified.

5. The combination, in a child's carriage, of the body composed of the sections A, B, and C, hinged together, as described, and rigidly fixed on the front axle, the frame D, on which the said body may slide horizontally, fixed on the rear axle, together with the handle $c$, hinged to said frame, and the cord G, secured to the rear section of the body and adapted to extend around the cross-bar of the handle, substantially as and for the purpose specified.

In testimony whereof I have hereunto set my hand this 11th day of October, 1881.

WM. C. LEWIS.

In presence of—
WM. G. BUSSEY,
TIMOTHY L. MURPHY.